US011388743B2

United States Patent
Yu et al.

(10) Patent No.: US 11,388,743 B2
(45) Date of Patent: Jul. 12, 2022

(54) SCHEDULING REQUEST SENDING METHOD, SCHEDULING REQUEST PROCESSING METHOD, AND RELATED DEVICE

(71) Applicant: Huawei Technologies Co., Ltd., Shenzhen (CN)

(72) Inventors: Haifeng Yu, Beijing (CN); Bin Xu, Beijing (CN); Zhenzhen Cao, Beijing (CN); Xiao Xiao, Beijing (CN); Xin Xiong, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 16/787,919

(22) Filed: Feb. 11, 2020

(65) Prior Publication Data

US 2020/0178286 A1 Jun. 4, 2020

Related U.S. Application Data

(63) Continuation of application No. PCT/CN2018/099209, filed on Aug. 7, 2018.

(30) Foreign Application Priority Data

Aug. 11, 2017 (CN) .......................... 201710689761.6

(51) Int. Cl.
*H04W 4/00* (2018.01)
*H04W 72/12* (2009.01)
(Continued)

(52) U.S. Cl.
CPC ....... *H04W 72/1284* (2013.01); *H04L 5/0048* (2013.01); *H04W 74/0833* (2013.01)

(58) Field of Classification Search
CPC .......... H04W 72/1284; H04W 74/0833; H04L 5/0048
(Continued)

(56) References Cited

U.S. PATENT DOCUMENTS

| 2015/0146677 | A1  | 5/2015 | Ito |
| 2018/0049227 | A1* | 2/2018 | Moon ............... H04W 72/0446 |
| 2018/0199343 | A1* | 7/2018 | Deogun ................ H04L 5/0044 |

FOREIGN PATENT DOCUMENTS

| CN | 106941725 A  | 7/2017 |
| JP | 2016164718 A | 9/2016 |

(Continued)

OTHER PUBLICATIONS

Samsung (R2-1709450, SR timers, Berlin, Germany, Jun. 27-29, 2017) (Year: 2017).*
(Continued)

*Primary Examiner* — Maharishi V Khirodhar
(74) *Attorney, Agent, or Firm* — Leydig, Voit & Mayer, Ltd.

(57) ABSTRACT

Embodiments of the present disclosure disclose devices and methods for sending and/or processing a scheduling request. The scheduling request sending method includes: determining whether there has a first scheduling resource configuration corresponding to the first logical channel according to first indication information, when the first logical channel of a terminal device has to-be sent data and a first scheduling request (SR) is triggered; where the first indication information includes a first mapping relationship which indicates a correspondence between a logical channel of the terminal device and a scheduling resource configuration, and the first scheduling resource configuration includes a first uplink control channel resource corresponding to the first logical channel; and sending the first SR to an access network
(Continued)

device by the first uplink control channel resource, when the first logical channel has a corresponding first scheduling resource configuration.

19 Claims, 9 Drawing Sheets

(51) Int. Cl.
*H04L 5/00* (2006.01)
*H04W 74/08* (2009.01)
(58) Field of Classification Search
USPC .......................................................... 370/329
See application file for complete search history.

(56) References Cited

FOREIGN PATENT DOCUMENTS

| RU | 2518966 C1 | 6/2014 |
|---|---|---|
| RU | 2549365 C2 | 4/2015 |
| RU | 2600978 C1 | 10/2016 |

OTHER PUBLICATIONS

Qualcomm (R2-170XXXX, "Enhancements to SR in NR", Hangzhou, China, May 15-19, 2017) (Year: 2017).*
"Enhanced SR in NR," 3GPP TSG-RAN WG2 Meeting #98, Hangzhou, China, R2-1704589, pp. 1-3, 3rd Generation Partnership Project, Valbonne, France (May 15-19, 2017).
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.3.0, pp. 1-107, 3rd Generation Partnership Project, Valbonne, France (Jun. 2017).
"SR on sPUCCH or PUCCH," 3GPP TSG-RAN WG2 Meeting #98, Hangzhou, China, R2-1705070, pp. 1-2, 3rd Generation Partnership Project, Valbonne, France (May 15-19, 2017).
"3rd Generation Partnership Project; Technical Specification Group Radio Access Network; Study on Scenarios and Requirements for Next Generation Access Technologies; (Release 14)," 3GPP TR 38.913 V14.3.0, pp. 1-39, 3rd Generation Partnership Project, Valbonne, France (Jun. 2017).
"SR triggering and cancellation," 3GPP TSG-RAN WG2 #98, Hangzhou, China, R2-1705198, pp. 1-3, 3rd Generation Partnership Project, Valbonne, France (May 15-19, 2017).
"3rd Generation Partnership Project; Technical Specification Group Radio Access Network; NR; Medium Access Control (MAC) protocol specification (Release 15)," 3GPP TS 38.321 V0.2.0, pp. 1-36, 3rd Generation Partnership Project, Valbonne, France (Aug. 2017).
"Discussion on SR and BSR enhancements," 3GPP TSG-RAN2 Meeting #98, Hangzhou, China, R2-1704054, pp. 1-3, 3rd Generation Partnership Project, Valbonne, France (May 15-19, 2017).
"Optimization of capability signalling," 3GPP TSG-RAN WG4 Meeting #83, Hangzhou, China, R2-1705612, pp. 1-8, 3rd Generation Partnership Project, Valbonne, France (May 15-19, 2017).
"Further Consideration on Multiple SR Configurations," 3GPP TSG-RAN WG2 Meeting #NR AH2, Qingdao, China, R2-1706367, pp. 1-4, 3rd Generation Partnership Project, Valbonne, France (Jun. 27-29, 2017).
"Consideration on the SR in NR," 3GPP TSG-RAN WG2#NR_ AdHoc#2, Qingdao, China, R2-1706641, pp. 1-2, 3rd Generation Partnership Project, Valbonne, France (Jun. 27-29, 2017).
"3rd Generation Partnership Project; Technical Specification Group Radio Access Network; NR; Radio Resource Control (RRC); Protocol specification (Release 15)," 3GPP TS 38.331 V0.0.4, pp. 1-22, 3rd Generation Partnership Project, Valbonne, France (Jun. 2017).
"Uplink dynamic scheduling in NR," 3GPP TSG-RAN WG2 #97, Athens, Greece, Tdoc R2-1700838 Update of R2-1700430, pp. 1-5, 3rd Generation Partnership Project, Valbonne, France (Feb. 13-17, 2017).

\* cited by examiner

SCHEDULING REQUEST SENDING METHOD, SCHEDULING REQUEST PROCESSING METHOD, AND RELATED DEVICE

CROSS-REFERENCE TO RELATED APPLICATIONS

This application is a continuation of International Application No. PCT/CN2018/099209, filed on Aug. 7, 2018, which claims priority to Chinese Patent Application No. 201710689761.6, filed on Aug. 11, 2017. The disclosures of the aforementioned applications are hereby incorporated by reference in their entireties.

TECHNICAL FIELD

Embodiments of the present disclosure relate to the field of communications technologies, and in particular, to a scheduling request sending method, a scheduling request processing method, and a related device.

BACKGROUND

In a wireless cellular network (for example, long term evolution (LTE)), before sending uplink data, a terminal device first needs to establish a radio resource control (RRC) connection to an access network device, and then sends a scheduling request (SR) to the access network device in a radio resource control connected state. If allowing the terminal device to send the uplink data, the access network device sends a scheduling instruction to the terminal device. Finally, the terminal device sends the uplink data to the access network device on a time-frequency resource indicated by the scheduling instruction. This transmission procedure may be referred to as scheduling transmission. However, the scheduling transmission has the following disadvantage: The terminal device has only one SR procedure, and consequently different scheduling requirements for diversified service types of the terminal device cannot be satisfied.

For example, ultra-reliable and low latency communications (URLLC) is one of three definite 5th-generation (5G) application scenarios. The application scenario has relatively high latency and reliability requirements. Therefore, during resource allocation performed for different services, a resource requirement of a URLLC service needs to be preferentially ensured. Therefore, during resource scheduling, how ultra-reliable and low latency scheduling requirements of the URLLC service are satisfied becomes a problem to be urgently resolved.

SUMMARY

Embodiments of the present disclosure provide a scheduling request sending method, a scheduling request processing method, and a related device, to send a scheduling request to an access network device based on a logical channel, so that the access network device properly allocates an uplink resource to the logical channel based on a service type of the logical channel.

According to a first aspect, an embodiment of the present disclosure provides a scheduling request sending method, including:

determining, whether there has a first scheduling resource configuration corresponding to a first logical channel according to pre-obtained first indication information, when the first logical channel of a terminal device has to-be sent data and thus a first scheduling request SR is triggered; wherein the first indication information comprises a first mapping relationship which indicates a correspondence between a logical channel of the terminal device and a scheduling resource configuration, and the first scheduling resource configuration comprises a first uplink control channel resource corresponding to the first logical channel and a first scheduling resource configuration identifier;

sending, the first SR to an access network device by using the first uplink control channel resource, when the first logical channel has a corresponding first scheduling resource configuration; wherein the first SR requests the access network device to allocate a first uplink resource, and the first uplink resource is configured to carry buffer status report BSR of the to-be-sent data and/or the to-be-sent data that are/is corresponding to the first logical channel and that are/is sent by the terminal device to the access network device; and receiving first uplink scheduling information sent by the access network device, where the first uplink scheduling information indicates the first uplink resource.

In this implementation, a scheduling request is sent to the access network device based on a scheduling resource configuration corresponding to a logical channel, so that the access network device can identify scheduling requirements of different logical channels, and quickly and properly allocate an uplink resource to the logical channel, to satisfy diversified resource use requirements of different services on the different logical channels.

In an optional implementation, before the determining, whether there has a first scheduling resource configuration corresponding to a first logical channel according to pre-obtained first indication information, the method further includes:

determining, whether the terminal device has the first uplink resource available to the first logical channel according to the first indication information; and the determining, whether there has a first scheduling resource configuration corresponding to a first logical channel according to pre-obtained first indication information comprises:

determining, whether there has the first scheduling resource configuration corresponding to the first logical channel according to the first indication information, when the terminal device does not have the first uplink resource.

In this implementation, before the scheduling request is sent, it is first determined whether there has an uplink resource available to the logical channel; and if there has an uplink resource available to the logical channel, the existing uplink resource is used for sending without sending the scheduling request to obtain the uplink resource, thereby reducing signaling consumption.

In an optional implementation, the first indication information further includes a second mapping relationship which indicates a correspondence between a logical channel of the terminal device and a resource usage numerology of an uplink resource, or a correspondence between a logical channel of the terminal device and a resource usage numerology identifier; and the determining, whether the terminal device has the first uplink resource available to the first logical channel according to the first indication information includes:

determining, whether the terminal device has the first uplink resource available to the first logical channel according to the second mapping relationship.

In this implementation, it is determined, by using a resource usage numerology corresponding to the logical channel, whether the terminal device has the available uplink resource, and if the terminal device has the available uplink resource, the existing uplink resource is used for sending without sending the scheduling request to obtain the uplink resource, thereby reducing the signaling consumption.

In an optional implementation, the method further includes:

sending, first buffer status report BSR of the to-be-sent data and/or the to-be-sent data to the access network device by using the first uplink resource, when the terminal device has the first uplink resource; wherein the BSR is configured to indicate amount of data of the data for the first logical channel which is buffered in the terminal device.

In this implementation, if there has already an uplink resource available to the logical channel, the existing uplink resource is used for sending without sending the scheduling request to obtain the uplink resource, thereby reducing the signaling consumption.

In an optional implementation, before the sending the first SR to an access network device by using the first uplink control channel resource, the method further includes:

obtaining a number of SR sending times and an SR-prohibit timer that are corresponding to the first logical channel, wherein the SR-prohibit timer is configured to limit the first logical channel sending the first SR on the corresponding first uplink control channel resource; the SR-prohibit timer is started when the first SR is sent through the first logical channel, and the SR-prohibit timer is stopped when one or more pending SRs corresponding to the first logical channel are canceled; the pending SR has been triggered but does not have been sent; and the sending the first SR to an access network device by using the first uplink control channel resource includes:

when the SR-prohibit timer is in a stopped state and the number of SR sending times is less than a preset maximum number of SR sending times, sending the first SR by using the first uplink control channel resource.

In this implementation, the SR-prohibit timer and the maximum number of SR sending times are used to avoid a waste of signaling resources caused by sending of excessive scheduling instructions on the logical channel.

In an optional implementation, when the number of SR sending times is greater than or equal to the maximum number of SR sending times, the method further includes at least one of the following:

instructing a radio resource control RRC layer to release the first uplink control channel resource corresponding to the first logical channel;

initiating random access to the access network device, and canceling the pending SR corresponding to the first logical channel, where the pending SR includes the first SR;

clearing downlink resource information and uplink grant resource information that are corresponding to the first logical channel; and instructing the radio resource control RRC layer to release a sounding reference signal SRS corresponding to the first logical channel.

In this implementation, if the number of SR sending times is greater than or equal to the maximum number of SR sending times and no resource is allocated by the access network device to the logical channel, it is considered that the scheduling request fails to be sent, and a resource allocated for the scheduling request is released, so that the resource can be used for another scheduling request.

Optionally, an SR failure message may be reported to the access network device to notify that an SR failure occurs on a corresponding resource. In this way, the access network device may release the resource in time, and configure the resource for another terminal device or a logical channel of another terminal device for use. The reported SR failure message may be carried in an RRC message, a MAC CE, or another uplink message.

In an optional implementation, the first indication information includes the maximum number of SR sending times and the SR-prohibit timer; or the first scheduling resource configuration includes the maximum number of SR sending times and the SR-prohibit timer.

In this implementation, each logical channel has a corresponding scheduling resource configuration, and the scheduling resource configuration includes a maximum number of SR sending times and an SR-prohibit timer of the logical channel. Therefore, sending of a scheduling request is limited at a logical-channel level.

In an optional implementation, when the first logical channel does not have a corresponding first scheduling resource configuration, the method further includes:

sending a buffer status report BSR of the to-be-sent data and/or the to-be-sent data on a second uplink resource, when a second logical channel of the terminal device obtains the second uplink resource; wherein the second logical channel is a logical channel different from the first logical channel, and the second uplink resource is an uplink resource allocated by the access network device in response to an SR sent through the second logical channel; or sending the first SR on a second uplink control channel resource corresponding to the second logical channel, when the second logical channel has a corresponding second scheduling resource configuration; where the second scheduling resource configuration includes the second uplink control channel resource.

In this implementation, if the logical channel does not have corresponding scheduling resource configuration, a scheduling resource configuration of another logical channel may be used to send the scheduling request, or an uplink resource applied for another logical channel is used to send uplink data.

In an optional implementation, when the first logical channel does not have a corresponding first scheduling resource configuration, the method further includes:

initiating random access to the access network device, and canceling the pending SR corresponding to the first logical channel; or requesting an uplink resource from the access network device in a grant-free manner; or sending the buffer status report BSR of the to-be-sent data and/or the to-be-sent data to the access network device in a grant-free manner.

In this implementation, if the logical channel does not have corresponding scheduling resource configuration, obtaining of the uplink resource or sending of the uplink data may be alternatively performed in a grant-free manner. Alternatively, the pending SR is canceled, and the uplink resource is obtained through random access.

In an optional implementation, the initiating random access to the access network device includes:

determining, whether there has a first physical random access channel PRACH resource configuration corresponding to the first logical channel according to the first indication information; where the first indication information further includes a third mapping relationship, and the third mapping relationship is used to indicate a correspondence between a logical channel of the terminal device and a PRACH resource; and initiating the random access to the access network device by the first physical random access channel resource, when the first logical channel has a corresponding first PRACH resource; or initiating the random access to the access network device by an available PRACH resource, when the first logical channel does not have a corresponding first PRACH resource.

In this implementation, if the logical channel has a corresponding PRACH resource, random access is initiated to the access network device by the PRACH resource, so that when receiving the random access initiated by using the PRACH resource, the access network device can determine, based on the correspondence between a logical channel and a PRACH resource, a logical channel initiating the random access, and then allocate a proper uplink resource to the logical channel based on a service type of the logical channel.

In an optional implementation, the method further includes:

canceling, by the terminal device, the first SR when a first condition is satisfied, wherein the first condition comprises at least one of the following:

a media access control protocol data unit MAC PDU includes the buffer status report BSR corresponding to the to-be-sent data, where the MAC PDU is a MAC PDU being assembled;

a grant-free resource and/or a semi-persistent scheduling resource have/has been configured for the first logical channel;

the first uplink resource corresponding to the first logical channel can contain all the to-be-sent data; and the first uplink resource corresponding to the first logical channel has been obtained for the first logical channel.

In this implementation, when the first condition is satisfied, sending of the scheduling request is canceled, to reduce signaling resources.

In an optional implementation, the method further includes:

triggering a third SR when a third logical channel of the terminal device has to-be-sent data, the first logical channel of the terminal device has to-be-sent data and the first scheduling request SR is sent by the first uplink control channel resource; and sending the third SR by a third uplink control channel resource corresponding to the third logical channel, to request a third uplink resource; wherein the first uplink control channel resource is different from the third uplink control channel resource.

In this implementation, scheduling request procedures can be simultaneously performed for different logical channels, that is, a plurality of scheduling request procedures can be simultaneously performed in the terminal device. However, different logical channels are corresponding to different uplink control channel resources for sending scheduling requests.

According to a second aspect, an embodiment of the present disclosure provides a scheduling request processing method, including:

receiving, by an access network device, a first scheduling request SR sent by a terminal device on a first uplink control channel resource, where the first uplink control channel resource belongs to a first scheduling resource configuration, the first scheduling resource configuration corresponds to a first logical channel, and the first SR is configured to request the access network device to allocate a first uplink resource;

determining, the first uplink resource; wherein the first uplink resource is configured to carry first uplink data sent by the terminal device to the access network device, which corresponds to the first logical channel; and sending, first uplink scheduling information to the terminal device which indicates the first uplink resource.

According to a third aspect, an embodiment of the present disclosure provides a terminal device, including a memory and a processor. The memory stores an instruction, the memory is connected to the processor through a line, and the processor is configured to invoke the instruction to perform the method according to the first aspect.

According to a fourth aspect, an embodiment of the present disclosure provides an access network device, including a memory and a processor. The memory stores an instruction, the memory is connected to the processor through a line, and the processor is configured to invoke the instruction to perform the method according to the second aspect.

According to a fifth aspect, an embodiment of the present disclosure provides a terminal device. The terminal device includes:

a first determining unit, configured to determine whether there has a first scheduling resource configuration corresponding to the first logical channel according to pre-obtained first indication information, when the first logical channel has to-be-sent data and a first scheduling request SR is triggered; where the first indication information comprises a first mapping relationship which indicates a correspondence between a logical channel of the terminal device and a scheduling resource configuration, and the first scheduling resource configuration comprises a first uplink control channel resource corresponding to the first logical channel;

a first sending unit, configured to send the first SR to an access network device by using the first uplink control channel resource, when the first logical channel has a corresponding first scheduling resource configuration; wherein the first SR requests the access network device to allocate a first uplink resource, and the first uplink resource is configured to carry buffer status report BSR of the to-be-sent data and/or the to-be-sent data that are/is corresponding to the first logical channel and that are/is sent by the terminal device to the access network device; and a receiving unit, configured to receive first uplink scheduling information sent by the access network device, where the first uplink scheduling information is configured to indicate the first uplink resource.

According to a sixth aspect, an embodiment of the present disclosure provides an access network device. The access network device includes:

a first receiving unit, configured to receive a first scheduling request SR sent by a terminal device on a first uplink control channel resource, where the first uplink control channel resource belongs to a first scheduling resource configuration, the first scheduling resource configuration is corresponding to a first logical channel, and the first SR is configured to request the access network device to allocate a first uplink resource;

a first determining unit, configured to determine the first uplink resource, wherein the first uplink resource is configured to carry first uplink data sent by the terminal device to the access network device, which corresponds to the first logical channel; and a first sending unit, configured to send first uplink scheduling information to the terminal device, where the first uplink scheduling information is configured to indicate the first uplink resource.

According to a seventh aspect, an embodiment of the present disclosure provides a computer-readable storage medium. The computer-readable storage medium stores an instruction, and when the instruction is run on a terminal device, the method according to the first aspect is implemented.

According to an eighth aspect, an embodiment of the present disclosure provides a computer-readable storage medium. The computer-readable storage medium stores an instruction, and when the instruction is run on an access network device, the method according to the second aspect is implemented.

According to a ninth aspect, an embodiment of the present disclosure provides a computer program product, and when the computer program product is run on a terminal device, the terminal device can implement the method according to the first aspect.

According to a tenth aspect, an embodiment of the present disclosure provides a computer program product, and when the computer program product is run on an access network device, the access network device can implement the method according to the second aspect.

According to an eleventh aspect, an embodiment of the present disclosure provides a communications system. The communications system includes a terminal device and an access network device. The terminal device is the terminal device according to the third aspect or the fifth aspect, and the access network device is the access network device according to the fourth aspect or the sixth aspect.

According to the embodiments of the present disclosure, the logical channel has the corresponding scheduling resource configuration, and the terminal device sends the scheduling request to the access network device based on the scheduling resource configuration corresponding to the logical channel, so that the access network device can identify the scheduling requirements of the different logical channels, and quickly and properly allocate the uplink resource to the logical channel, to satisfy the diversified resource use requirements of the different services on the different logical channels.

BRIEF DESCRIPTION OF DRAWINGS

To describe technical solutions in the embodiments of the present disclosure more clearly, the following describes the accompanying drawings required for describing the embodiments of the present disclosure.

DESCRIPTION OF EMBODIMENTS

The following describes the embodiments of the present disclosure with reference to the accompanying drawings in the embodiments of the present disclosure.

Figure 1:
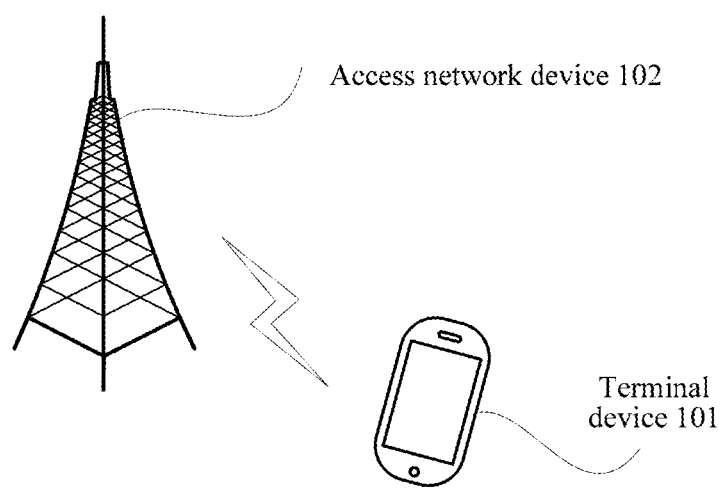
FIG. 1 is a schematic structural diagram of a communications system according to an embodiment of the present disclosure.

FIG. 1 is a schematic structural diagram of a communications system according to an embodiment of the present disclosure. The communications system includes a terminal device 101 and an access network device 102, and the communications system may further include another device. Optionally, the devices in the communications system may perform communication by using a wireless communications technology. The wireless communications technology may be a 2nd-generation (2G) technology, a 3rd-generation (3G) technology, an LTE technology, a 4th-generation (4G) technology, a 5th-generation (5G) technology, a wireless fidelity (Wi-Fi) technology, or the like.

The terminal device 101 may be a handheld device (for example, a mobile phone, a tablet computer, or a palmtop computer) having a wireless communication function, an in-vehicle device (for example, an automobile, a bicycle, an electric vehicle, an airplane, or a ship), a wearable device (for example, a smartwatch, a smart band, or a pedometer), a smart household device (for example, a refrigerator, a television, an air conditioner, or an electric meter), an intelligent robot, workshop equipment, or another processing device that can be connected to a wireless modem, and may include various forms of devices, such as user equipment (UE), a mobile station (MS), a terminal, or terminal equipment.

The access network device 102 may be a base station device in a new radio (NR) system, for example, a gNB, a transmission reception point (TRP), or a base station device including a central unit (CU) and a distributed unit (DU). The CU may also be referred to as a control unit. When a base station device in an LTE system, namely, an evolved NodeB (eNB), can be connected to a 5G core network (5G CN), the LTE eNB may also be referred to as an eLTE eNB. Specifically, the eLTE eNB is an LTE base station device evolved based on the LTE eNB. In addition, the access network device 102 may be alternatively an access point (AP) or another network device having a capability of communicating with the terminal device and the core network. A type of the access network device is not particularly limited in the embodiments of the present disclosure. Moreover, a base station device in a GSM system is a base transceiver station (BTS) or a base station controller (BSC); a base station device in UMTS is a NodeB or a radio network controller (RNC).

How the terminal device 101 in the communications system sends a scheduling request (SR) to the access network device 102 and how the access network device 102 allocates an uplink resource to the terminal device 101 after receiving the SR sent by the terminal device 101 are specifically described in the embodiments of the present disclosure.

Figure 2:
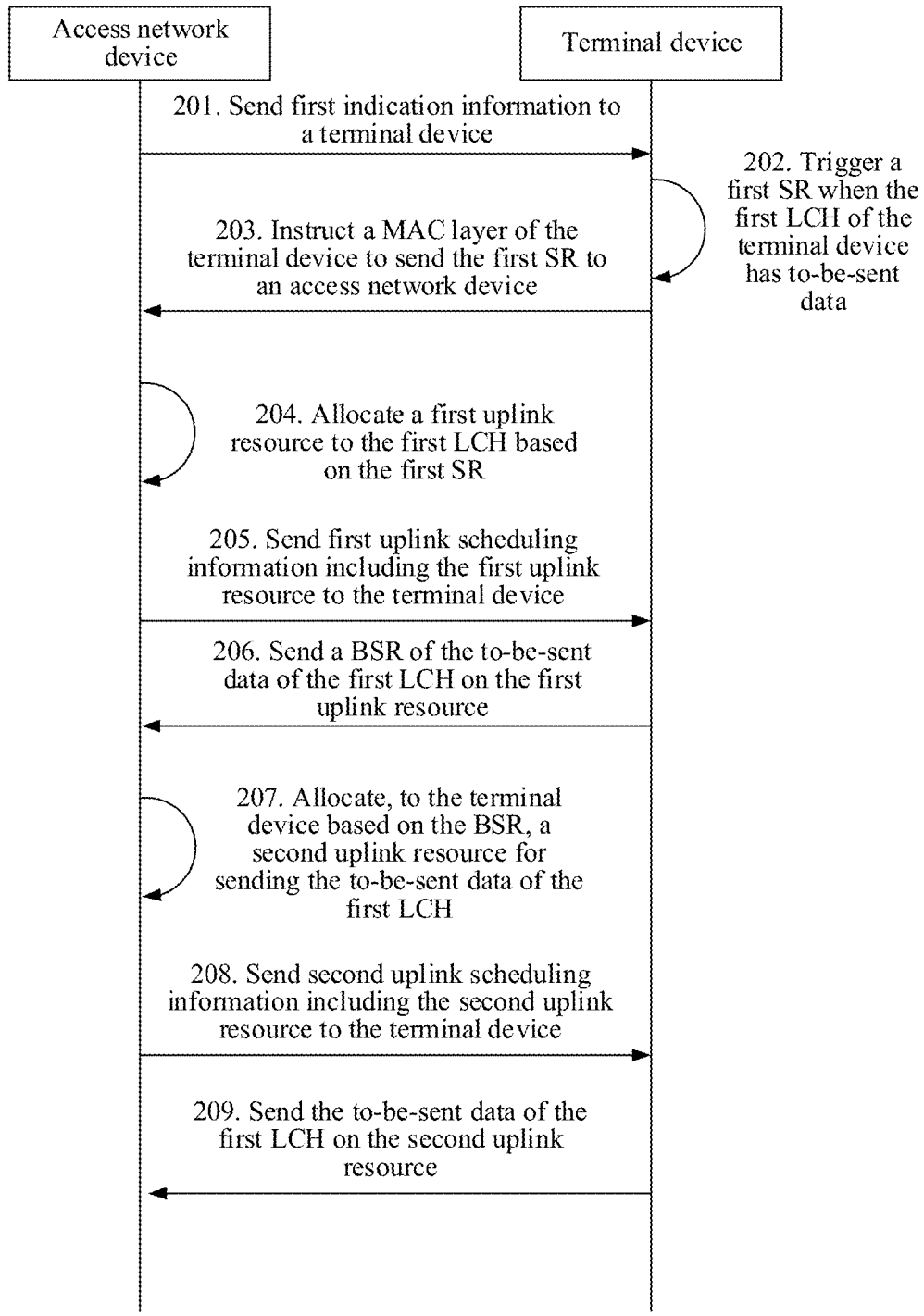
FIG. 2 is a schematic diagram of interaction between a terminal device and an access network device in a scheduling procedure according to an embodiment of the present disclosure.

FIG. 2 is a schematic diagram of interaction between a terminal device and an access network device in a scheduling procedure according to an embodiment of the present disclosure. The scheduling procedure shown in FIG. 2 may be implemented by the communications system described in FIG. 1. As shown in FIG. 2, the scheduling procedure includes but is not limited to the following steps.

201. The access network device sends first indication information to the terminal device.

In this embodiment of the present disclosure, the first indication information may be configuration information of a logical channel (LCH) of the terminal device. The terminal device may send, for a first LCH on which there is currently to-be-sent data, an SR on a corresponding uplink control channel resource based on the configuration information of the LCH.

202. Trigger a first SR when the first LCH of the terminal device has to-be-sent data.

In this embodiment of the present disclosure, when the to-be-sent data of the first LCH arrives at the terminal device, and if a trigger condition of a regular buffer status report (BSR) is satisfied, the terminal device triggers the regular BSR for the first LCH. If the regular BSR has been triggered and an SR-prohibit timer is not running, the first SR is triggered.

203. The terminal device instructs a media access control (MAC) layer of the terminal device to send the first SR to the access network device.

In this embodiment of the present disclosure, the terminal device may send the first SR to the access network device by using the uplink control channel resource corresponding to the first LCH. Subsequently, the access network device may properly allocate a required uplink resource to the first LCH based on pre-learned attribute information of the first LCH.

However, it should be noted that after the first SR is triggered, the first SR is canceled in the following cases:

(a) An upper-layer entity of the terminal device instructs the MAC layer entity to send the first SR. Therefore, a protocol data unit of the MAC layer is monitored, and if the protocol data unit of the MAC layer has included a BSR of the to-be-sent data of the first LCH, it indicates that there is already an uplink resource for sending the BSR, and in this case, the first SR may be canceled.

(b) If a grant-free resource and/or a semi-persistent scheduling (SPS) resource has been configured for the first LCH, the first SR is canceled, and the BSR of the to-be-sent data and/or the to-be-sent data are/is directly sent by using the grant-free resource and/or the SPS scheduling resource.

(c) If the first LCH already has an uplink grant (UL grant) that is sufficient to send the BSR and/or the to-be-sent data, the first SR is canceled, and the BSR and/or the to-be-sent data are/is directly sent by using an uplink resource indicated by the uplink grant.

(d) If an uplink grant corresponding to the first LCH has been obtained for the first LCH, it indicates that the uplink grant returned by the access network device for an SR sent before has been obtained. Therefore, sending of the first SR is canceled.

204. The access network device allocates, to the first LCH based on the received first SR, a first uplink resource for sending the BSR.

In this embodiment of the present disclosure, the access network device has a correspondence between an LCH of the terminal device and an uplink control channel resource. Therefore, it can be determined, based on the uplink control channel resource on which the first SR is received, that an LCH for which the scheduling request is triggered is the first LCH. Subsequently, the uplink resource is allocated to the first LCH based on an attribute of the first LCH.

205. The access network device sends first uplink scheduling information including the first uplink resource to the terminal device.

In this embodiment of the present disclosure, the access network device allocates, to the first LCH, the first uplink resource for sending the BSR, and sends the first uplink scheduling information including the first uplink resource to the terminal device.

206. The terminal device sends, on the corresponding first uplink resource based on the first uplink scheduling information, the BSR corresponding to the to-be-sent data of the first LCH.

In this embodiment of the present disclosure, the BSR is used to indicate amount of data of the to-be-sent data of the first LCH. After learning of the amount of data of the to-be-sent data, the access network device allocates the corresponding uplink resource, so that the terminal device sends the to-be-sent data to the access network device.

207. The access network device allocates, to the terminal device based on the received BSR, a second uplink resource for sending the to-be-sent data of the first LCH.

208. The access network device sends second uplink scheduling information including the second uplink resource to the terminal device.

209. The terminal device sends the to-be-sent data of the first LCH on the second uplink resource based on the second uplink scheduling information.

It can be learned from the foregoing that, in a 5G communications system, the terminal device has more than one logical channel, and each logical channel is bound to a particular service. However, different services have different scheduling requirements. Therefore, in this embodiment of the present disclosure, scheduling may be performed based on the logical channel, to satisfy the scheduling requirements of the different services, and quickly and properly allocate the uplink resource.

In the following descriptions, how a terminal device sends a logical channel-based scheduling request to an access network device (corresponding to steps 201 to 203 in the scheduling procedure) is specifically described by using an embodiment of the present disclosure that is corresponding to FIG. 3A, and how the access network device allocates an uplink resource to a logical channel of the terminal device based on the received scheduling request (corresponding to steps 204, 205, 207, and 208 in the scheduling procedure) is specifically described by using an embodiment of the present disclosure that is corresponding to FIG. 4.

Figure 3A:
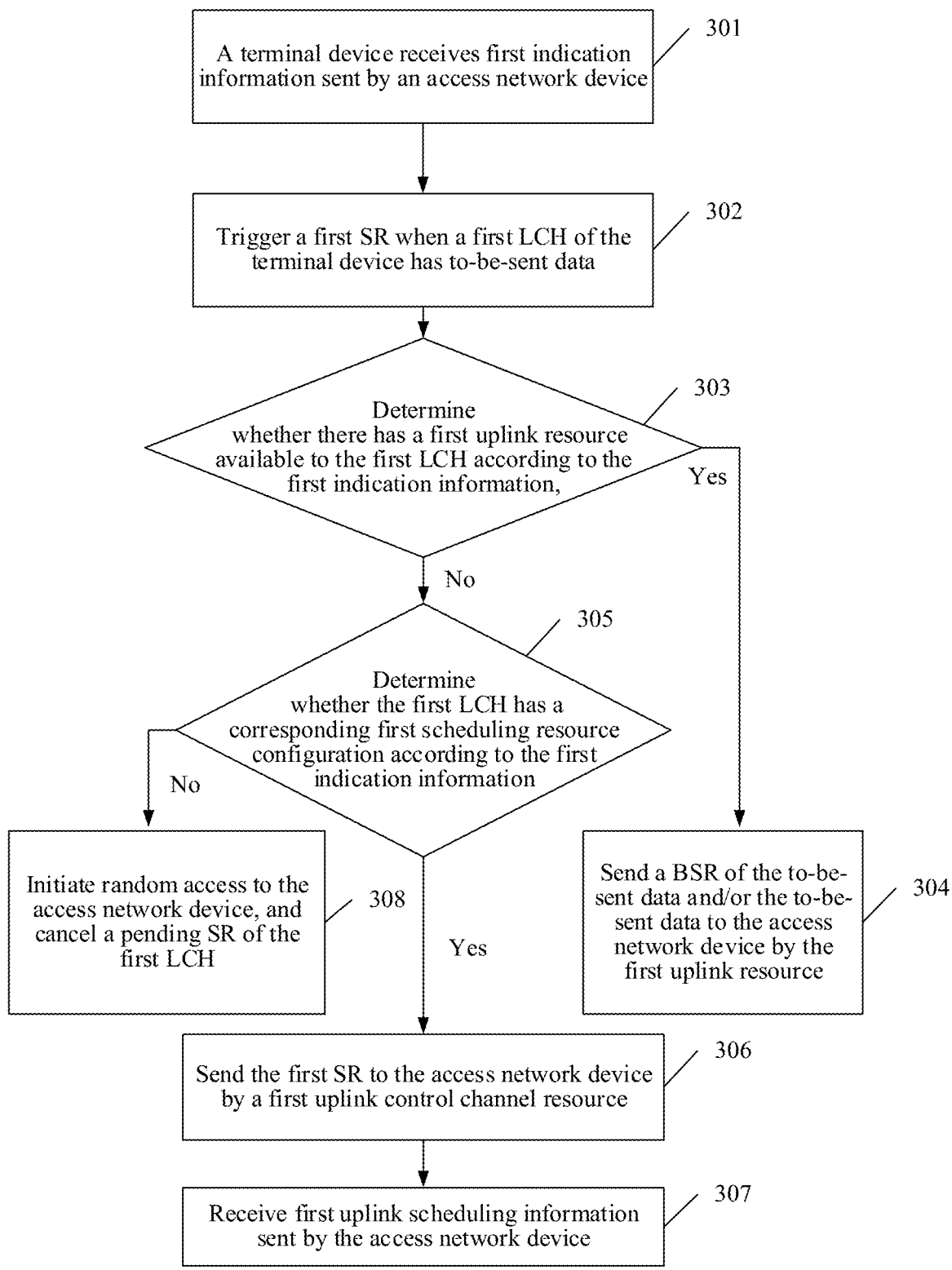
FIG. 3A is a schematic flowchart of a scheduling request sending method according to an embodiment of the present disclosure.

FIG. 3A is a schematic flowchart of a scheduling request sending method according to an embodiment of the present disclosure. The method may be performed by the terminal device 101 in FIG. 1. As shown in FIG. 3A, the method includes but is not limited to the following steps.

301. The terminal device receives first indication information sent by an access network device.

In an optional implementation, the access network device may send the first indication information to the terminal device by using radio resource control signaling or media access control signaling.

In this embodiment of the present disclosure, the first indication information may be configuration information of a logical channel (LCH) of the terminal device. After determining the configuration information of the LCH, the access network device sends the configuration information to the terminal device, so that the terminal device sends, based on the configuration information of the LCH, an SR by using an uplink control channel resource corresponding to the LCH.

The configuration information of the LCH may include an SR parameter setting, a buffer status report (BSR) parameter configuration, and a plurality of mapping relationships. For example, the mapping relationships may include: a correspondence between an LCH and a scheduling resource configuration, a correspondence between an LCH and a resource usage numerology (or a resource usage numerology identifier) of an uplink resource, and a correspondence between an LCH and a physical random access channel (PRACH) resource configuration.

Figure 3B:
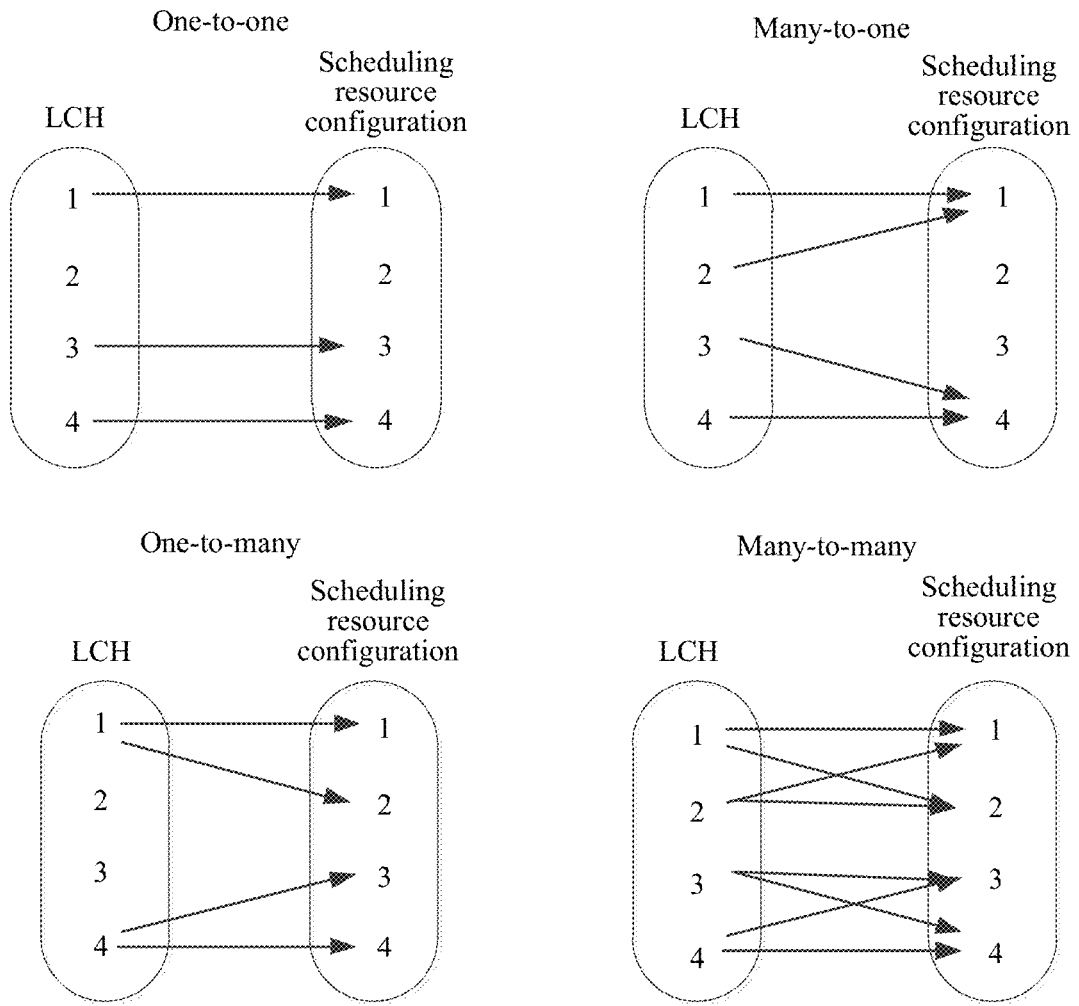
FIG. 3B is a schematic diagram of a correspondence between an LCH and a scheduling resource configuration according to an embodiment of the present disclosure.

Further, FIG. 3B is a schematic diagram of a correspondence between an LCH and a scheduling resource configuration according to an embodiment of the present disclosure. As shown in FIG. 3B, LCHs numbered 1 to 4 may be corresponding to four scheduling resource configurations in different manners. Correspondences between an LCH and a scheduling resource configuration may be a one-to-one correspondence, a many-to-one correspondence, a one-to-many correspondence, and a many-to-many correspondence. A quantity of LCHs and a quantity of scheduling resource configurations in FIG. 3B are merely examples. This is not limited in this embodiment of the present disclosure.

Further, the scheduling resource configuration may include at least one of the following: parameters such as sr-ProhibitTimer, dsr-TransMax, sr-PUCCH-ResourceIndex, and sr-ConfigIndex. Specific descriptions thereof are as follows:

sr-ProhibitTimer is an SR-prohibit timer, and is used to control a time interval of SR sending, to avoid frequent SR sending. If an SR is sent on an LCH, an SR-prohibit timer corresponding to the LCH is started. In a running process of the SR-prohibit timer, if a new SR is triggered on the LCH to generate a pending SR, the pending SR is canceled, and the SR-prohibit timer is stopped.

When no new SR is triggered and the SR-prohibit timer is stopped, preset running duration of the SR-prohibit timer may be set based on requirements of different services. For example, a URLLC service is characterized by a low latency. Therefore, preset running duration of an SR-prohibit timer of an LCH corresponding to the URRLC service needs to be set to be relatively small, to ensure that an SR can be sent in time on the LCH corresponding to the URLLC service.

The parameter dsr-TransMax indicates a maximum number of SR sending times, and is used to control a quantity of sent SRs, to avoid frequent SR sending. sr-ConfigIndex is an SR physical time-frequency resource related configuration. sr-PUCCH-ResourceIndex is an SR physical frequency-domain resource related configuration, and includes an uplink control channel resource (for example, which may be a physical uplink control channel (PUCCH) resource) available to SR sending.

The parameter sr-ConfigIndex indicates an indication of an SR configuration. There are a plurality of NR-based SR configurations. Therefore, the index is used to indicate an SR configuration type of a current SR configuration.

In view of presence of a correspondence between a logical channel set and the scheduling resource configuration, a logical channel set or a logical channel list is required to indicate the correspondence between the logical channel set and the scheduling resource configuration or the logical channel set in correspondence with the scheduling resource configuration. The logical channel set or the logical channel list includes one or more logical channel identifiers, for example, logical channel identifiers (LCID), that are corresponding to the scheduling resource configuration.

Optionally, to indicate that there is a correspondence between the logical channel set and the scheduling resource configuration, a scheduling resource configuration corresponding to a logical channel may be added to a logical channel configuration. There may be one or more corresponding scheduling resource configurations, and a form of representation may be a scheduling resource configuration set or a scheduling resource configuration list. The scheduling resource configuration set or the scheduling resource configuration list includes a scheduling resource configuration identifier, for example, sr-ConfigIndex, that is corresponding to the one or more scheduling resource configurations.

302. Trigger a first SR when a first LCH of the terminal device has to-be-sent data.

In this embodiment of the present disclosure, when data arrives and a trigger condition of a regular BSR is satisfied, the regular BSR may be triggered. Subsequently, if an SR trigger mechanism is satisfied, the first SR may be triggered.

In an optional implementation, the terminal device may have two SR trigger mechanisms. A first SR trigger mechanism is applicable to all LCHs, and a second SR trigger mechanism is separately configured for an individual LCH. For example, the first SR trigger mechanism may be: If the regular BSR has been triggered and an SR-prohibit timer is not running, an SR is triggered. The second SR trigger mechanism may be: Permission on quick SR trigger is configured for some LCHs (for example, an LCH corresponding to the URLLC service having a high priority). When a condition of the quick SR trigger is satisfied, SRs can be quickly triggered for these LCHs.

Specifically, the condition of the quick SR trigger may be: In a 5G application scenario, if a beam failure recovery request is triggered, but an uplink resource fails to be obtained based on the beam failure recovery request, an SR can be quickly triggered to request the uplink resource.

The condition of the quick SR trigger may be alternatively: If the regular BSR of the first LCH having the permission on the quick SR trigger has been triggered, and an SR-prohibit timer is not running, an SR is triggered. However, a difference from the first SR trigger mechanism is that, preset running duration of the SR-prohibit timer corresponding to the first LCH is smaller than preset running duration of the SR-prohibit timer in the first SR trigger mechanism.

It should be noted that, in the foregoing descriptions, the SR-prohibit timer is set for LCHs, and the LCHs maintains respective SR-prohibit timers. However, in an optional implementation, the SR-prohibit timer may be alternatively set for the terminal device, and the SR-prohibit timer is started when an SR is sent on any LCH in the terminal device. In this case, priorities of LCHs of the terminal device may be set, and an SR can continue to be sent on an LCH having a high priority, without being limited by the SR-prohibit timer. For example, the first SR is sent on the first LCH, and the SR-prohibit timer is started. During running of the SR-prohibit timer, if a second SR is triggered on a second LCH, and a priority of the second LCH is higher than that of the first LCH, the second SR is normally sent, and the SR-prohibit timer is not stopped.

303. The terminal device determines, according to the first indication information, whether there has a first uplink resource available to the first LCH; and if there has a first uplink resource available to the first LCH, performs step 304; or if there has no first uplink resource available to the first LCH, performs step 305 to step 308.

It can be learned from the descriptions of step 301 that, the first indication information includes the correspondence between an LCH of the terminal device and a resource usage numerology (or a resource usage numerology identifier) of an uplink resource, and the terminal device may determine, based on the correspondence, whether there is currently a first uplink resource available to the first LCH.

In an optional implementation, the resource usage numerology includes at least one of a resource period, a transmission time interval length, a subcarrier spacing, a coding scheme, a multi-access mode, a number of carriers occupied in frequency domain, whether to perform frequency-domain repeated transmission, whether to perform time-domain repeated transmission, a transmit power indicator, and a cyclic prefix CP.

304. Send a BSR of the to-be-sent data and/or the to-be-sent data to the access network device by the first uplink resource.

In this embodiment of the present disclosure, if there has already an uplink resource available to the first LCH, the SR does not need to be sent to the access network device to request the uplink resource. Therefore, the terminal device may send the BSR of the to-be-sent data of the first LCH and/or the to-be-sent data of the first LCH to the access network device by using the first uplink resource.

The BSR is used to indicate amount of data of the data for the first LCH which is buffered in the terminal device.

305. The terminal device determines, according to the first indication information, whether the first LCH has a corresponding first scheduling resource configuration; and if the first LCH has a corresponding first scheduling resource configuration, performs step 306 and step 307; or if the first LCH does not have a corresponding first scheduling resource configuration, performs step 308.

It can be learned from the descriptions of step 301 that, the first indication information includes the correspondence between an LCH of the terminal device and a scheduling resource configuration. Therefore, the correspondence may be queried to obtain the first scheduling resource configuration corresponding to the first LCH.

306. Send the first SR to the access network device by a first uplink control channel resource, where the first SR is used to request the access network device to allocate the first uplink resource to the first LCH.

In this embodiment of the present disclosure, if the first LCH has a corresponding first scheduling resource configuration, the first SR may be sent to the access network device by the first uplink control channel resource (for example, which may be a physical uplink control channel (PUCCH) resource) included in the first scheduling resource configuration.

In an optional implementation, before the first SR is sent to the access network device, a number of SR sending times (SR_COUNTER) and the SR-prohibit timer (sr-Prohibit-Timer) that are corresponding to the first LCH are obtained. The SR-prohibit timer is used to limit sending of the first SR through the first logical channel and on the corresponding first uplink control channel resource. The SR-prohibit timer is started when the first SR is sent through the first logical channel, and is stopped when one or more pending SRs corresponding to the first logical channel are canceled. The pending SR is an SR that has been triggered but does not have been sent.

When sr-ProhibitTimer is in a stopped state and SR_COUNTER is less than the preset maximum number of SR sending times (dsr-TransMax), at least one of the following cases is included:

instructing a physical layer of the terminal device to send the first SR on the available first uplink control channel resource; and increasing the number of SR sending times corresponding to the first logical channel by 1, and starting the SR-prohibit timer.

In another case, if SR_COUNTER is greater than or equal to dsr-TransMax, it is considered that the SR fails to be sent, and the resource allocated to the first LCH is released. The implementation may specifically include:

instructing a radio resource control (RRC) layer to release the first uplink control channel resource corresponding to the first LCH; clearing downlink resource information and uplink grant resource information that are corresponding to the first LCH; and instructing the RRC layer to release a sounding reference signal (SRS) corresponding to the first LCH.

When it is considered that the SR fails to be sent, the terminal device may initiate random access to the access network device, and cancel the pending SR of the first LCH. The pending SR includes the first SR.

Optionally, one logical channel may be corresponding to a plurality of SR configurations, and each SR configuration is corresponding to one quantity of SR sending times (SR_COUNTER). This is equivalent to that one logical channel maintains a plurality of SR COUNTERs, and an SR configuration corresponding to an SR COUNTER that first reaches a corresponding maximum limitation is released.

307. Receive first uplink scheduling information sent by the access network device, where the first uplink scheduling information is used to indicate the first uplink resource allocated to the first LCH.

In this embodiment of the present disclosure, after receiving the first SR, the access network device may allocate the first uplink resource to the first LCH based on the first SR, and then deliver the first uplink resource to the terminal device by using the first uplink scheduling information.

308. Initiate random access to the access network device, and cancel the pending SR of the first LCH.

In an optional implementation, random access may be initiated to the access network device in the following manner.

It can be learned from the descriptions of step 301 that, the first indication information includes the correspondence between an LCH of the terminal device and a PRACH resource. Therefore, the correspondence may be queried to obtain a first PRACH resource corresponding to the first LCH, and then the random access is initiated to the access network device by using the first PRACH resource. In another case, when there is no first PRACH resource corresponding to the first LCH, another available PRACH resource of the terminal device is obtained to initiate the random access to the access network device.

In a particular example, when no PUCCH resource is available to any logical channel of the terminal device, the uplink resource may be applied for through random access. In this case, if the terminal device has configured a plurality of PRACH resource configurations, the following several methods are used by the terminal device to select a PRACH resource to initiate the random access:

(1) The terminal device randomly selects a PRACH resource.

(2) The access network device stipulates a rule, namely, a PRACH use rule. For example, a preferable sequence is used as the rule. The preferable sequence may carry a protocol or a preconfiguration. The preconfiguration is delivered by the access network device by using a downlink message. The downlink message includes a system message, an RRC message, a PDCCH message, or a MAC CE message. For another example, a logical channel priority is used as the rule, and is bound to a PRACH resource. A higher logical channel priority indicates a higher use priority of a PRACH resource bound to the logical channel priority.

(3) The random access is initiated based on a resource usage numerology corresponding to a PRACH resource.

(4) A PRACH resource that is first available in time domain is used to initiate the random access.

Optionally, if a logical channel bound to a PRACH belongs to duplicated LCHs, where the duplicated LCHs indicate that content sent on the logical channel is the same as that sent on another logical channel. In this case, if an SR failure occurs on an LCH 1 or there is no PUCCH resource available to the LCH 1 in the two duplicated LCHs (for example, the LCH 1 and an LCH 2), but no SR failure occurs on the LCH 2 or there is a PUCCH available to the LCH 2, a relationship between an SR process corresponding to the LCH 1 and an SR process corresponding to the LCH 2 includes the following.

Optionally, the SR process of the LCH 1 is independent of the SR process of the LCH 2, and the SR processes do not interfere with each other. In this case, according to the foregoing method, random access is initiated by using a PRACH corresponding to each logical channel. Alternatively, other LCHs than the LCH 1 are waited to request an uplink resource, so that the LCH 1 can use the uplink resource.

Optionally, the SR process of the LCH 1 is not independent of the SR process of the LCH 2, and has a dependent relationship with the SR process of the LCH 2. Although the SR failure occurs on the LCH 1 or there is no PUCCH available to the LCH 1, an uplink resource can still be requested for the LCH 2 forming the duplicated LCHs with the LCH 1. In this case, the LCH 1 may not trigger random access unless an SR failure also occurs on the LCH 2 or there is no PUCCH available to the LCH 2.

In a random access procedure in the prior art, when a quantity of random access preamble sending times exceeds a maximum limitation, a radio link failure may be triggered. However, in an application of duplicated LCHs, if a quantity of random access preamble sending times corresponding to one of two duplicated LCHs exceeds the maximum limitation, a radio link failure RLF (Radio Link Failure) may not be triggered unless a quantity of random access preamble sending times corresponding to the other LCH in the duplicated LCHs also exceeds the maximum limitation.

However, in the application of the duplicated LCHs, if the quantity of random access preamble times corresponding to one of the two duplicated LCHs exceeds the maximum limitation, and a primary component carrier is bound to the LCH, the radio link failure may be triggered. However, if a secondary component carrier is bound to the LCH, the radio link failure is not triggered. In other words, in the application of the duplicated LCHs, whether to trigger an RLF is determined based on a specific condition.

In this embodiment of the present disclosure, if the first LCH does not have a corresponding first scheduling resource configuration, the uplink resource is obtained through random access. Alternatively, the following several manners may be used to obtain the uplink resource or perform data transmission:

(a) When a second uplink resource is obtained for the second LCH of the terminal device, the to-be-sent data of the first LCH and/or the BSR of the to-be-sent data may be sent on the second uplink resource.

(b) When the second LCH of the terminal device has a corresponding second scheduling resource configuration, the first SR of the first LCH may be sent on a second uplink control channel resource included in the second scheduling resource configuration.

(c) The uplink resource is requested from the access network device in a grant-free (grant-free) manner.

(d) The to-be-sent data of the first LCH and/or the BSR of the to-be-sent data are/is sent to the access network device in a grant-free manner.

It can be learned from the foregoing that, according to the scheduling request sending method described in FIG. 3A, a logical channel has a corresponding scheduling resource configuration, and the terminal device sends a scheduling request to the access network device based on the scheduling resource configuration corresponding to the logical channel, so that the access network device can identify scheduling requirements of different logical channels, and quickly and properly allocates an uplink resource to the logical channel, to satisfy diversified resource use requirements of different services on the different logical channels.

Figure 4:
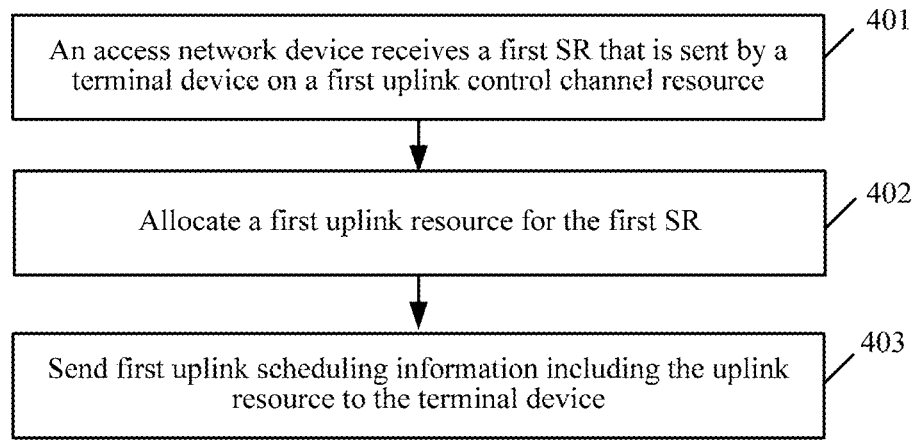
FIG. 4 is a schematic flowchart of a scheduling request processing method according to an embodiment of the present disclosure.

FIG. 4 is a schematic flowchart of a scheduling request processing method according to an embodiment of the present disclosure. The method may be performed by the access network device 102 in FIG. 1. As shown in FIG. 4, the method includes but is not limited to the following steps.

401. The access network device receives a first scheduling request SR that is sent by a terminal device on a first uplink control channel resource.

In this embodiment of the present disclosure, the terminal device sends the first SR on the first uplink control channel resource, so that the access network device can be implicitly notified that an LCH for which an uplink resource is currently required is a first LCH. The access network device specifically determines, in the following manner, the LCH for which the uplink resource is currently required.

A plurality of scheduling resource configurations included in the access network device may be queried to determine that the first uplink control channel resource belongs to a first scheduling resource configuration. It can be learned from the descriptions of step 301 in FIG. 3A that, after configuring configuration information of an LCH for the terminal device, the access network device sends, to the terminal device, the configuration information of the LCH as first indication information. The configuration information of the LCH includes a correspondence between an LCH and a scheduling resource configuration. Therefore, when it is learned that the first uplink control channel resource belongs to the first scheduling resource configuration, the correspondence between an LCH and a scheduling resource configuration may be queried to determine that the LCH for which the uplink resource is currently required is the first LCH.

402. Allocate a first uplink resource for the first SR.

In this embodiment of the present disclosure, the access network device allocates the uplink resource for the SR based on an attribute of the first LCH. The uplink resource is used to carry uplink data that is corresponding to the first LCH and that is to be sent by the terminal device to the access network device.

In an optional implementation, the attribute of the LCH may include an LCH priority, a resource usage numerology, and the like. The access network device allocates the uplink resource for the first SR based on the attribute of the LCH. Uplink resource information that is delivered to the terminal device and that needs to be notified to the terminal device includes: an uplink resource size, a modulation and coding scheme MCS, uplink power, the resource usage numerology, a resource usage numerology identifier, and the like.

In an optional implementation, the resource usage numerology includes a resource period, a transmission time interval length, a subcarrier spacing, a coding scheme, a multi-access mode, a number of carriers occupied in frequency domain, whether to perform frequency-domain repeated transmission, whether to perform time-domain repeated transmission, a transmit power indicator, a cyclic prefix CP, and the like.

403. Send first uplink scheduling information including the uplink resource to the terminal device.

In this embodiment of the present disclosure, the access network device delivers an uplink grant (UL grant) to the terminal device, to notify the terminal device of the available uplink resource.

In addition, when the uplink resource is allocated to the terminal device based on the SR sent by the terminal device, there may be a case in which the access network device receives a plurality of SRs sent by the terminal device and the plurality of received SRs are corresponding to one scheduling resource configuration. For this case, the access network device may deliver the uplink grant (UL grant) to the terminal device in the following several manners.

(a) Uplink resource allocation is performed only once for the plurality of SRs, and only one UL grant is returned.

(b) A same uplink resource is returned for the SRs, but indication information is added to the UL grant. The terminal device may learn, based on the indication information, that the access network device allocates the same uplink resource.

(c) Different uplink resources are returned for the SRs. After receiving a plurality of uplink resources, the terminal device selects a specific uplink resource for use depending on an implementation of the terminal device or according to a preset rule.

In addition, if a second LCH does not have corresponding scheduling resource configuration but the second LCH has a corresponding first PRACH resource, the terminal device may not send an SR, but send a random access request to the access network device by using the first PRACH resource. In this case, the access network device may allocate a second uplink resource to the second LCH in the following manner.

It can be learned from the descriptions of step 301 in FIG. 3A that, after configuring the configuration information of the LCH for the terminal device, the access network device sends, to the terminal device, the configuration information of the LCH as the first indication information. The configuration information of the LCH includes a correspondence between an LCH and a PRACH resource. Therefore, the correspondence between an LCH and a PRACH may be queried to determine that an LCH for which the uplink resource is currently required is the second LCH. Subsequently, the second uplink resource is allocated for the random access request of the second LCH based on an attribute of the second LCH.

It can be learned from the foregoing that according to the scheduling request processing method described in FIG. 4, the access network device can identify scheduling requirements of different logical channels, and quickly and properly allocate an uplink resource to a logical channel, to satisfy diversified resource use requirements of different services on the different logical channels.

The foregoing details the methods in the embodiments of the present disclosure, and the following provides apparatuses in the embodiments of the present disclosure.

Figure 5:
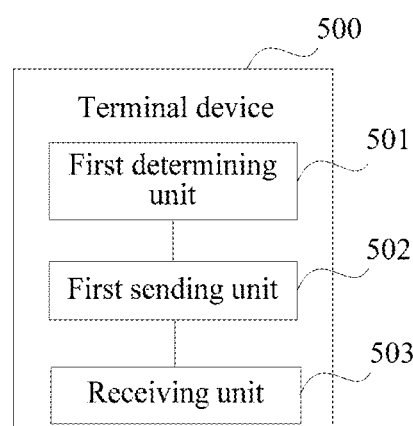
FIG. 5 is a schematic structural diagram of a terminal device 500 according to an embodiment of the present disclosure.

FIG. 5 is a schematic structural diagram of a terminal device 500 according to an embodiment of the present disclosure. The terminal device 500 may include a first determining unit 501, a first sending unit 502, and a receiving unit 503.

The first determining unit 501 is configured to determine whether there has a first scheduling resource configuration corresponding to a first logical channel according to pre-obtained first indication information, when the first logical channel of a terminal device has to-be sent data and a first scheduling request SR is triggered; wherein the first indication information comprises a first mapping relationship which indicates a correspondence between a logical channel of the terminal device and a scheduling resource configuration, and the first scheduling resource configuration comprises a first uplink control channel resource corresponding to the first logical channel.

The first sending unit 502 is configured to send the first SR to an access network device by using the first uplink control channel resource, when the first logical channel has a corresponding first scheduling resource configuration; wherein the first SR requests the access network device to allocate a first uplink resource, and the first uplink resource is used to carry buffer status report BSR of the to-be-sent data and/or the to-be-sent data that are/is corresponding to the first logical channel and that are/is sent by the terminal device to the access network device.

The receiving unit 503 is configured to receive first uplink scheduling information sent by the access network device, where the first uplink scheduling information is used to indicate the first uplink resource.

It can be learned from the foregoing that, in the terminal device 500 described in FIG. 5, a logical channel has a corresponding scheduling resource configuration, and the terminal device sends a scheduling request to the access network device based on the scheduling resource configuration corresponding to the logical channel, so that the access network device can identify scheduling requirements of different logical channels, and quickly and properly allocate an uplink resource to the logical channel, to satisfy diversified resource use requirements of different services on the different logical channels.

Figure 6:
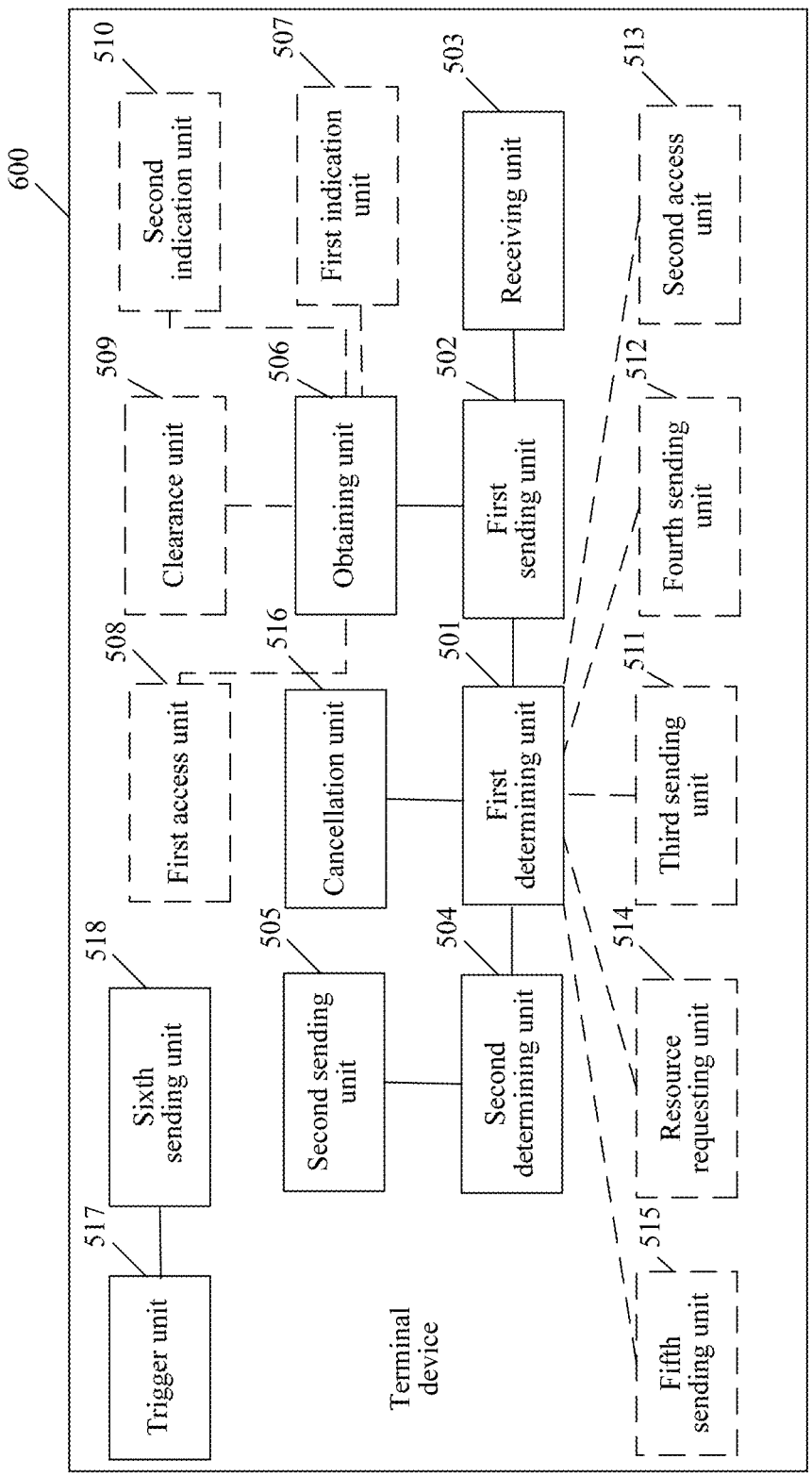
FIG. 6 is a schematic structural diagram of another terminal device 600 according to an embodiment of the present disclosure.

FIG. 6 is a schematic structural diagram of another terminal device according to an embodiment of the present disclosure. The terminal device 600 described in FIG. 6 may be obtained based on the terminal device 500 described in FIG. 5. Compared with the terminal device 500, the terminal device 600 further includes:

a second determining unit 504, configured to determine, according to the first indication information, whether the terminal device 600 has the first uplink resource available to the first logical channel. In an optional implementation, the first determining unit 501 is specifically configured to: when the terminal device 600 does not have the first uplink resource, determine, according to the first indication information, whether there has a first scheduling resource configuration corresponding to the first logical channel.

In an optional implementation, the first indication information further includes a second mapping relationship, and the second mapping relationship is used to indicate a correspondence between a logical channel of the terminal device 600 and a resource usage numerology of an uplink resource or a correspondence between a logical channel of the terminal device 600 and a resource usage numerology identifier. The second determining unit 504 is specifically configured to determine, based on the second mapping relationship, whether the terminal device 600 has the first uplink resource available to the first logical channel.

In an optional implementation, the terminal device 600 further includes:

a second sending unit 505, configured to: when the terminal device 600 has the first uplink resource, send first buffer status report BSR of the to-be-sent data and/or the to-be-sent data to the access network device by the first uplink resource, where the BSR is used to indicate amount of data of the data for the first logical channel which is buffered in the terminal device 600.

In an optional implementation, the terminal device 600 further includes:

an obtaining unit 506, configured to obtain a number of SR sending times corresponding to the first logical channel and an SR-prohibit timer corresponding to the first logical channel; wherein the SR-prohibit timer is configured to limit the first logical channel sending the first SR on the corresponding first uplink control channel resource; the SR-prohibit timer is started when the first SR is sent through the first logical channel, and the SR-prohibit timer is stopped when one or more pending SRs corresponding to the first logical channel are canceled; the pending SR has been triggered but does not have been sent.

In the foregoing implementation, the first sending unit 502 is specifically configured to: when the SR-prohibit timer is in a stopped state and the number of SR sending times corresponding to the first logical channel is less than a preset maximum number of SR sending times, send the first SR on the available first uplink control channel resource; and/or increase the number of SR sending times corresponding to the first logical channel by 1, and start the SR-prohibit timer.

In an optional implementation, the terminal device 600 further includes:

a first indication unit 507, configured to: when the number of SR sending times corresponding to the first logical channel is greater than or equal to the maximum number of SR sending times, instruct a radio resource control RRC layer to release the first uplink control channel resource corresponding to the first logical channel; and/or a first access unit 508, configured to: when the number of SR sending times corresponding to the first logical channel is greater than or equal to the maximum number of SR sending times, initiate random access to the access network device, and cancel a pending SR triggered on a to-be-canceled logical channel, where the to-be-canceled logical channel includes a logical channel on which buffer status information has been reported and/or a logical channel on which transmission of all to-be-transmitted data has been completed, and the pending SR includes the first SR corresponding to the first logical channel; and/or a clearance unit 509, configured to: when the number of SR sending times corresponding to the first logical channel is greater than or equal to the maximum number of SR sending times, clear downlink resource information and uplink grant resource information that are corresponding to the first logical channel; and/or a second indication unit 510, configured to: when the number of SR sending times corresponding to the first logical channel is greater than or equal to the maximum number of SR sending times, instruct the radio resource control RRC layer to release a sounding reference signal SRS corresponding to the first logical channel.

In an optional implementation, the first indication information includes the maximum number of SR sending times and the SR-prohibit timer; or the first scheduling resource configuration includes the maximum number of SR sending times and the SR-prohibit timer.

In an optional implementation, the terminal device 600 further includes:

a third sending unit 511, configured to: when the first logical channel does not have a corresponding first scheduling resource configuration and a second uplink resource is obtained for a second logical channel of the terminal device 600, send the buffer status report BSR of the to-be-sent data and/or the to-be-sent data on the second uplink resource, where the second logical channel is a logical channel different from the first logical channel, and the second uplink resource is an uplink resource allocated by the access network device in response to an SR sent through the second logical channel; or a fourth sending unit 512, configured to: when the first logical channel does not have a corresponding first scheduling resource configuration and the second logical channel has a corresponding second scheduling resource configuration, send the first SR on a second uplink control channel resource corresponding to the second logical channel, where the second scheduling resource configuration includes the second uplink control channel resource.

In an optional implementation, the terminal device 600 further includes:

a second access unit 513, configured to initiate random access to the access network device, and cancel the pending SR corresponding to the first logical channel, when the first logical channel does not have a corresponding first scheduling resource configuration; or a resource requesting unit 514, configured to request an uplink resource from the access network device in a grant-free manner, when the first logical channel does not have a corresponding first scheduling resource configuration; or a fifth sending unit 515, configured to send the buffer status report BSR of the to-be-sent data and/or the to-be-sent data to the access network device in a grant-free manner, when the first logical channel does not have a corresponding first scheduling resource configuration.

In an optional implementation, the first access unit 508 and the second access unit 513 include:

a determining subunit, configured to determine whether there has a first physical random access channel PRACH resource configuration corresponding to the first logical channel according to the first indication information, where the first indication information further includes a third mapping relationship, the third mapping relationship is used to indicate a correspondence between a logical channel of the terminal device 600 and a PRACH resource configuration, and the first PRACH resource configuration includes a first physical random access channel resource corresponding to the first logical channel; and an access subunit, configured to initiate the random access to the access network device by the first physical random access channel resource, when the first logical channel has a corresponding first PRACH resource; or initiate the random access to the access network device by an available PRACH resource, when the first logical channel does not have a corresponding first PRACH resource.

In an optional implementation, the terminal device 600 further includes:

a cancellation unit 516, configured to: when a first condition is satisfied, cancel the first SR, where the first condition includes at least one of the following:

a media access control protocol data unit MAC PDU includes the buffer status report BSR corresponding to the to-be-sent data, where the MAC PDU is a MAC PDU being assembled;

a grant-free resource and/or a semi-persistent scheduling resource have/has been configured for the first logical channel;

the first uplink resource corresponding to the first logical channel can contain all the to-be-sent data; and the first uplink resource corresponding to the first logical channel has been obtained for the first logical channel.

In an optional implementation, the terminal device 600 further includes:

a trigger unit 517, configured to: when there is to-be-sent data on the first logical channel of the terminal device 600 and the first scheduling request SR is sent by using the first uplink control channel resource, trigger a third SR when there is to-be-sent data on a third logical channel of the terminal device 600; and a sixth sending unit 518, configured to send the third SR by using a third uplink control channel resource corresponding to the third logical channel, to request a third uplink resource, where the first uplink control channel resource is different from the third uplink control channel resource.

It can be learned from the foregoing that, in the terminal device 600 described in FIG. 6, the logical channel has the corresponding scheduling resource configuration, and the terminal device sends the scheduling request to the access network device based on the scheduling resource configuration corresponding to the logical channel, so that the access network device can identify the scheduling requirements of the different logical channels, and quickly and properly allocates the uplink resource to the logical channel, to satisfy the diversified resource use requirements of the different services on the different logical channels.

Figure 7:
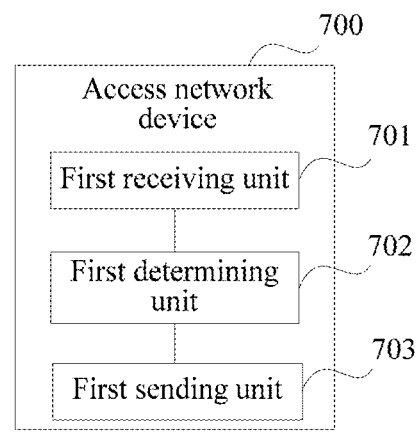
FIG. 7 is a schematic structural diagram of an access network device 700 according to an embodiment of the present disclosure.

FIG. 7 is a schematic structural diagram of an access network device 700 according to an embodiment of the present disclosure. The access network device 700 may include a first receiving unit 701, a first determining unit 702, and a first sending unit 703.

The first receiving unit 701 is configured to receive a first scheduling request SR that is sent by a terminal device on a first uplink control channel resource, where the first uplink control channel resource belongs to a first scheduling resource configuration, the first scheduling resource configuration is corresponding to a first logical channel, and the first SR is used to request the access network device to allocate a first uplink resource.

The first determining unit 702 is configured to determine the first uplink resource, where the first uplink resource is used to carry first uplink data sent by the terminal device to the access network device, which corresponds to the first logical channel.

The first sending unit 703 is configured to send first uplink scheduling information to the terminal device, where the first uplink scheduling information is used to indicate the first uplink resource.

In an optional implementation, the first uplink resource includes at least one of an uplink resource size, a modulation and coding scheme MCS, uplink power, a resource usage numerology, and a resource usage numerology identifier.

In an optional implementation, the resource usage numerology includes at least one of a resource period, a transmission time interval length, a subcarrier spacing, a coding scheme, a multi-access mode, a number of carriers occupied in frequency domain, whether to perform frequency-domain repeated transmission, whether to perform time-domain repeated transmission, a transmit power indicator, and a cyclic prefix CP.

It can be learned from the foregoing that, the access network device 700 described in FIG. 7 can identify scheduling requirements of different logical channels, and quickly and properly allocate an uplink resource to a logical channel, to satisfy diversified resource use requirements of different services on the different logical channels.

Figure 8:
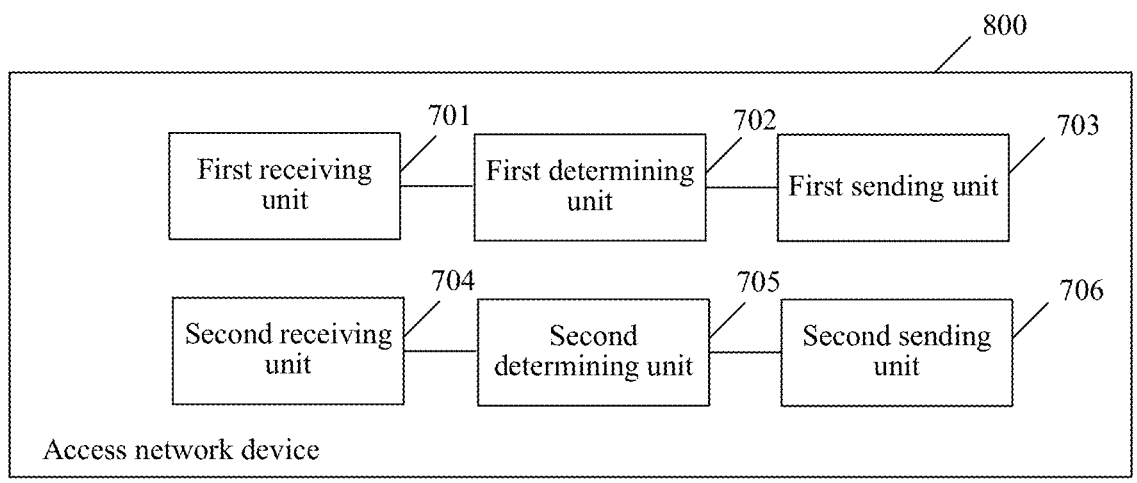
FIG. 8 is a schematic structural diagram of another access network device 800 according to an embodiment of the present disclosure.

FIG. 8 is a schematic structural diagram of another access network device 800 according to an embodiment of the present disclosure. The access network device 800 may be obtained based on the access network device 700. Compared with the access network device 700, the access network device 800 further includes:

a second receiving unit 704, configured to receive a random access request sent by the terminal device on a first physical random access channel PRACH resource, where the first PRACH resource is corresponding to a second logical channel, and the random access request is used to request the access network device 800 to allocate a second uplink resource;

a second determining unit 705, configured to determine the second uplink resource; wherein the second uplink resource is configured to carry second uplink data sent by the terminal device to the access network device, which corresponds to the second logical channel; and a second sending unit 706, configured to send second uplink scheduling information to the terminal device, where the second uplink scheduling information is used to indicate the second uplink resource.

It can be learned from the foregoing that, the access network device 800 described in FIG. 8 can identify the scheduling requirements of the different logical channels, and quickly and properly allocate the uplink resource to the logical channel, to satisfy the diversified resource use requirements of the different services on the different logical channels.

Figure 9:
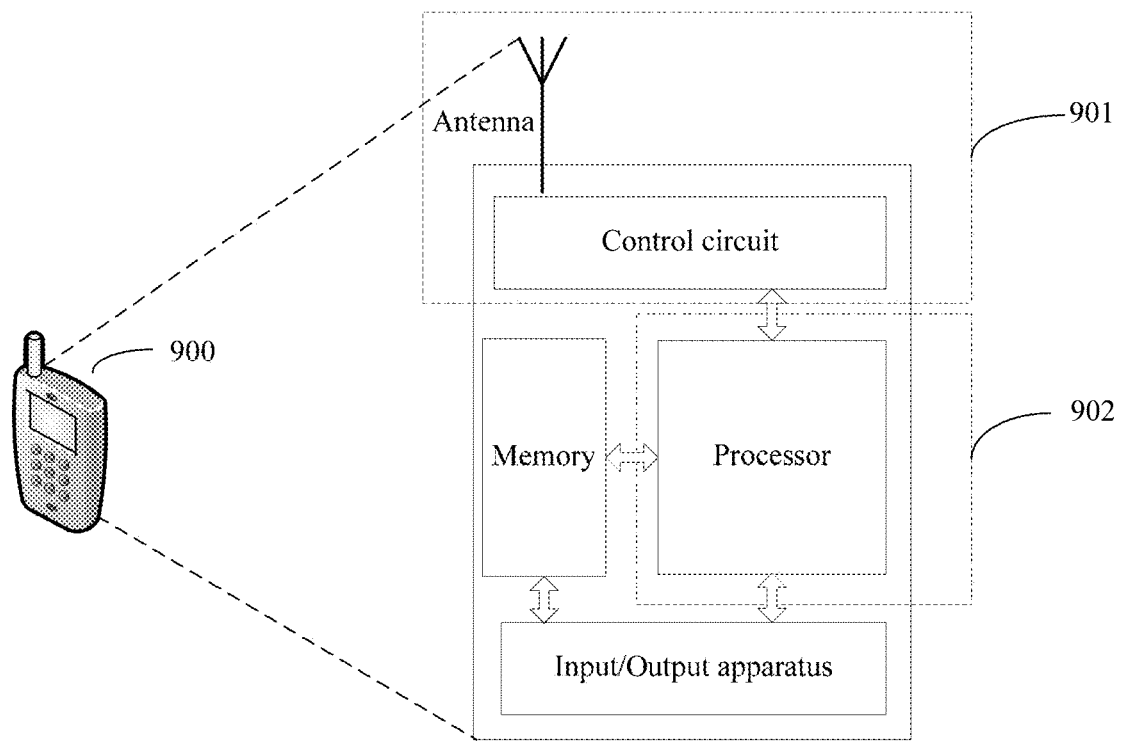
FIG. 9 is a schematic structural diagram of still another terminal device 900 according to an embodiment of the present disclosure.

FIG. 9 is a schematic structural diagram of another terminal device 900 according to an embodiment of the present disclosure. The terminal device may perform operations of the terminal device in the method shown in FIG. 2 or FIG. 3A.

For ease of description, FIG. 9 only shows main components of the terminal device. As shown in FIG. 9, the terminal device 900 includes a processor, a memory, a control circuit, an antenna, and an input/output apparatus. The processor is mainly configured to process a communication protocol and communications data, control the entire user equipment, execute a software program, and process data of the software program. For example, the processor is configured to support the terminal device in performing the procedure described in FIG. 2 or FIG. 3A. The memory is mainly configured to store the software program and data. The control circuit is mainly configured to: perform conversion between a baseband signal and a radio frequency signal, and process the radio frequency signal. The control circuit together with the antenna may also be referred to as a transceiver, mainly configured to receive and send a radio frequency signal in an electromagnetic wave form. For example, the transceiver may be configured to perform the step of sending the first scheduling request in FIG. 3A. For details, refer to the descriptions in the foregoing related part. The terminal device 900 further has the input/output apparatus, for example, a touchscreen, a display screen, or a keyboard, mainly configured to receive data entered by a user and output data to the user.

After the terminal device is turned on, the processor may read the software program in the memory, interpret and execute the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal out in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art can understand that, for ease of description, FIG. 9 shows only one memory and one processor. Actually, the terminal device may include a plurality of processors and a plurality of memories. The memory may also be referred to as a storage medium, a storage device, or the like. This is not limited in this embodiment of the present disclosure.

In an optional implementation, the processor may include a baseband processor and a central processing unit. The baseband processor is mainly configured to process the communication protocol and the communications data, and the central processing unit is mainly configured to: control the entire terminal device, execute the software program, and process the data of the software program. Functions of the baseband processor and the central processing unit are integrated into the processor in FIG. 9. A person skilled in the art can understand that the baseband processor and the central processing unit each may be an independent processor, and are interconnected by using technologies such as a bus. A person skilled in the art can understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be represented as a baseband processing circuit or a baseband processing chip. The central processing unit may also be represented as a central processing circuit or a central processing chip. A function of processing the communication protocol and the communications data may be built into the processor, or may be stored in the storage unit in a form of a software program, so that the processor executes the software program to implement a baseband processing function.

For example, in this embodiment of the present disclosure, the antenna and the control circuit that have receiving and sending functions may be considered as a transceiver unit 901 of the terminal device 900, and the processor having a processing function may be considered as a processing unit 902 of the terminal device 900. As shown in FIG. 9, the terminal device 900 includes the transceiver unit 901 and the processing unit 902. The transceiver unit may also be referred to as a transceiver, a transceiver apparatus, or the like. Optionally, a component for implementing a receiving function in the transceiver unit 901 may be considered as a receiving unit, and a component for implementing a sending function in the transceiver unit 901 may be considered as a sending unit. That is, the transceiver unit 901 includes the receiving unit and the sending unit. For example, the receiving unit may also be referred to as a receiver, a receiver circuit, or the like, and the sending unit may be referred to as a transmitter, a transmitter, a transmitter circuit, or the like.

Referring to FIG. 5 and FIG. 6, the first determining unit 501, the second determining unit 504, the obtaining unit 506, the first indication unit 507, the first access unit 508, the clearance unit 509, the second indication unit 510, the second access unit 513, the resource requesting unit 514, the cancellation unit 516, and the trigger unit 517 in FIG. 5 and FIG. 6 may be implemented the processing unit 902 described in FIG. 9.

The first sending unit 502, the receiving unit 503, the second sending unit 505, the third sending unit 511, the fourth sending unit 512, the fifth sending unit 515, and the sixth sending unit 518 may be the transceiver unit 901 described in FIG. 9.

It can be learned from the foregoing that, in the terminal device 900 described in FIG. 9, a logical channel has a corresponding scheduling resource configuration, and the terminal device sends a scheduling request to an access network device based on the scheduling resource configuration corresponding to the logical channel, so that the access network device can identify scheduling requirements of different logical channels, and quickly and properly allocate an uplink resource to the logical channel, to satisfy diversified resource use requirements of different services on the different logical channels.

Figure 10:
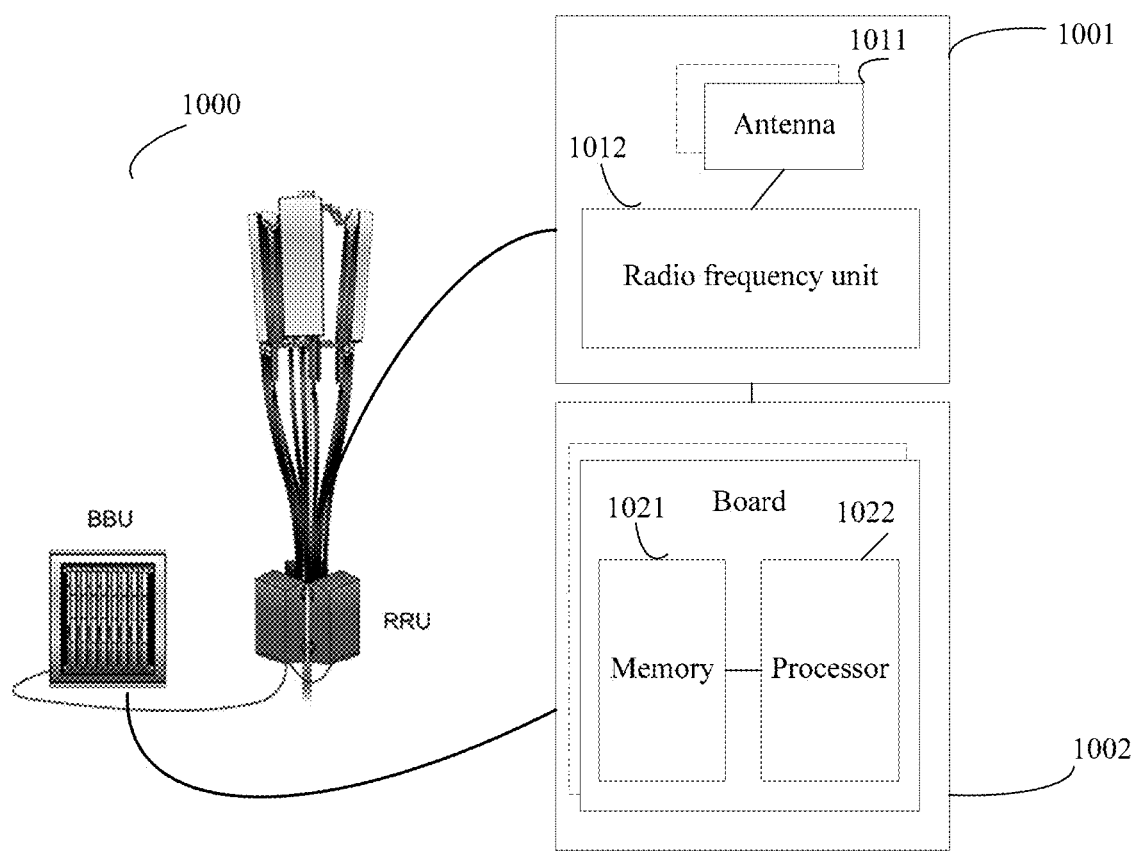
FIG. 10 is a schematic structural diagram of still another access network device 1000 according to an embodiment of the present disclosure.

FIG. 10 is a schematic structural diagram of an access network device according to an embodiment of the present disclosure. The access network device may be a base station. The base station 1000 may perform operations of the base station in the method shown in FIG. 2 or FIG. 4.

The base station 1000 includes one or more remote radio units (RRU) 1001 and one or more baseband units (BBU) 1002. The RRU 1001 may be referred to as a transceiver unit, a transceiver, a transceiver circuit, a transceiver, or the like, and may include at least one antenna 1011 and at least one radio frequency unit 1012. The RRU 1001 is mainly configured to: receive and send a radio frequency signal, and perform conversion between the radio frequency signal and a baseband signal. For example, the RRU 1001 is configured to send the indication information in the foregoing embodiment to user equipment. The BBU 1002 part is mainly configured to: perform baseband processing, control the base station, and the like. The RRU 1001 and the BBU 1002 may be physically disposed together; or may be physically separately disposed, that is, the base station is a distributed base station.

The BBU 1002, also referred to as a processing unit, is a control center of the base station, and is mainly configured to implement baseband processing functions such as channel coding, multiplexing, modulation, and spectrum spreading. For example, the BBU (the processing unit) may be configured to control the base station to perform the procedure shown in FIG. 2 or FIG. 4.

In an example, the BBU 1002 may include one or more boards. A plurality of boards can jointly support a radio access network (for example, an LTE network) conforming to a single access standard, or can respectively support radio access networks conforming to different access standards. The BBU 1002 further includes a memory 1021 and a processor 1022. The memory 1021 is configured to store a necessary message and necessary data. The processor 1022 is configured to control the base station to perform a necessary action, for example, control the base station to perform the procedure shown in FIG. 2 or FIG. 4. The memory 1021 and the processor 1022 may serve one or more boards. In other words, a memory and a processor may be separately disposed on each board, or the plurality of boards may share a same memory and processor. In addition, a necessary circuit is disposed on each board.

Referring to both FIG. 7 and FIG. 8, the first receiving unit 701, the first sending unit 703, the second receiving unit 704, and the second sending unit 706 in FIG. 7 and FIG. 8 may be the RRU 1001 described in FIG. 10. The first determining unit 702, the second receiving unit 704, and the second determining unit 705 may be the BBU 1002 described in FIG. 10.

It can be learned from the foregoing that, the access network device 1000 described in FIG. 10 can identify scheduling requirements of different logical channels, and quickly and properly allocate an uplink resource to a logical channel, to satisfy diversified resource use requirements of different services on the different logical channels.

An embodiment of the present disclosure further provides a computer-readable storage medium. The computer-readable storage medium stores an instruction, and when the instruction is run on a terminal device, the terminal device sends a scheduling request to an access network device. For details of sending the scheduling request by the terminal device to the access network device, refer to the descriptions of the method embodiments shown in FIG. 2 and FIG. 3A.

An embodiment of the present disclosure further provides a computer-readable storage medium. The computer-readable storage medium stores an instruction, and when the instruction is run on an access network device, the access network device receives a scheduling request sent by a terminal device, and allocates an uplink resource to a logical channel of the terminal device for the scheduling request. For details of actions performed by the access network device, refer to the descriptions of the method embodiments shown in FIG. 2 and FIG. 4.

An embodiment of the present disclosure further provides a computer program product. When the computer program product is run on a terminal device, for details of actions performed by the terminal device, refer to the descriptions of the method embodiments shown in FIG. 2 and FIG. 3A.

An embodiment of the present disclosure further provides a computer program product. When the computer program product is run on an access network device, for details of actions performed by the access network device, refer to the descriptions of the method embodiments shown in FIG. 2 and FIG. 4.

In conclusion, in the embodiments of the present disclosure, the logical channel has the corresponding scheduling resource configuration, and the terminal device sends the scheduling request to the access network device based on the scheduling resource configuration corresponding to the logical channel, so that the access network device can identify the scheduling requirements of the different logical channels, and quickly and properly allocate the uplink resource to the logical channel, to satisfy the diversified resource use requirements of the different services on the different logical channels.

A person of ordinary skill in the art can understand that all or some of the procedures of the methods in the embodiments may be implemented by a computer program instructing relevant hardware. The program may be stored in a computer-readable storage medium. When the program is run, the procedures in the method embodiments may be performed. The foregoing storage medium includes: any medium that can store program code, such as a read-only memory (ROM), a random access memory (RAM), a magnetic disk, or an optical disc.

What is claimed is:

1. A scheduling request sending method, comprising:
   receiving, by a terminal device, first indication information from an access network device, wherein the first indication information indicates a correspondence between a first logical channel of the terminal device and a first scheduling resource configuration, the first scheduling resource configuration comprises a first uplink control channel resource and a first scheduling resource configuration identifier;
   sending, by the terminal device, a first scheduling request to the access network device on the first uplink control channel resource, wherein the first SR requests the access network device to allocate a first uplink resource, the first uplink resource is for sending a buffer state report (BSR), the BSR corresponds to a to-be sent data, the to-be sent data corresponds to the first logical channel; and
   receiving, by the terminal device, first uplink scheduling information from the access network device; wherein the first uplink scheduling information indicates the first uplink resource.

2. The method according to claim 1, wherein before the sending the first SR to the access network device on the first uplink control channel resource, the method further comprises:
   obtaining a number of SR sending times corresponding to the first logical channel and an SR-prohibit timer corresponding to the first logical channel;
   wherein the SR-prohibit timer is configured to limit the first logical channel sending the first SR on the corresponding first uplink control channel resource;
   wherein the SR-prohibit timer is started when the first SR is sent through the first logical channel, and the SR-prohibit timer is stopped when one or more pending SRs corresponding to the first logical channel are canceled;
   wherein the pending SR has been triggered but has not been sent; and
   wherein the sending the first SR to the access network device on the first uplink control channel resource comprises:
   performing at least one of the following operations, when the SR-prohibit timer is in a stopped state and the number of SR sending times is less than a preset maximum number of SR sending times:
   sending the first SR to the access network device on an available first uplink control channel resource; or
   increasing the number of SR sending times by 1, and starting the SR-prohibit timer.

3. The method according to claim 2, wherein in response to that the number of SR sending times is greater than or equal to the maximum number of SR sending times, the method further includes at least one of the following:
   instructing a radio resource control (RRC) layer to release the first uplink control channel resource corresponding to the first logical channel;
   initiating random access to the access network device, and canceling a pending SR triggered on a to-be-canceled logical channel, wherein the to-be-canceled logical channel comprises a logical channel on which buffer status information has been reported and/or a logical channel on which transmission of all to-be-transmitted data has been completed; and the pending SR comprises the first SR corresponding to the first logical channel;

clearing downlink resource information and uplink grant resource information that are corresponding to the first logical channel; or instructing the radio resource control (RRC) layer to release a sounding reference signal (SRS) corresponding to the first logical channel.

4. The method according to claim 2, wherein the first scheduling resource configuration further comprises the maximum number of SR sending times and the SR-prohibit timer.

5. The method according to claim 1,
wherein there is not a first scheduling resource configuration corresponding to the first logical channel, and the method further comprises:
initiating random access to the access network device, and canceling the pending SR corresponding to the first logical channel; or
requesting an uplink resource from the access network device in a grant-free manner; or
sending the buffer status report (BSR) of the to-be-sent data and/or the to-be-sent data to the access network device in a grant-free manner.

6. The method according to claim 5, wherein the initiating the random access to the access network device comprises:
determining whether there is a first physical random access channel (PRACH) resource configuration corresponding to the first logical channel according to the first indication information, wherein the first indication information further comprises a third mapping relationship which indicates a correspondence between a logical channel of the terminal device and a PRACH resource configuration, and the first PRACH resource configuration comprises a first physical random access channel resource corresponding to the first logical channel; and
initiating the random access to the access network device by the first physical random access channel resource, in response to that the first logical channel has a corresponding first PRACH resource; or
initiating the random access to the access network device by an available PRACH resource, in response to that the first logical channel does not have a corresponding first PRACH resource.

7. The method according to claim 1, wherein the method further comprises:
sending a first BSR of the to-be-sent data and/or the to-be-sent data to the access network device by using the first uplink resource, when the terminal device has the first uplink resource; wherein the BSR is configured to indicate amount of data of the data for the first logical channel which is buffered in the terminal device.

8. An apparatus, comprising a processor and a non-transitory computer readable storage medium storing a program, which when executed by the processor, causes the processor to perform operations comprising:
receiving first indication information from an access network device, wherein the first indication information indicates a correspondence between a first logical channel of the terminal device and a first scheduling resource configuration, the first scheduling resource configuration comprises a first uplink control channel resource and a first scheduling resource configuration identifier;
sending a first scheduling request (SR) to the access network device on the first uplink control channel resource, wherein the first SR requests the access network device to allocate a first uplink resource, the first uplink resource is for sending a buffer state report (BSR) the BSR corresponds to a to-be sent data, and the to-be sent data corresponds to the first logical channel; and
receiving first uplink scheduling information from the access network device; wherein the first uplink scheduling information indicates the first uplink resource.

9. The apparatus according to claim 8, wherein before the sending the first SR to the access network device on the first uplink control channel resource, the method further comprises:
obtaining a number of SR sending times corresponding to the first logical channel and an SR-prohibit timer corresponding to the first logical channel;
wherein the SR-prohibit timer is configured to limit the first logical channel sending the first SR on the corresponding first uplink control channel resource;
wherein the SR-prohibit timer is started when the first SR is sent through the first logical channel, and the SR-prohibit timer is stopped when one or more pending SRs corresponding to the first logical channel are canceled;
wherein the pending SR has been triggered but has not been sent; and
wherein the sending the first SR to the access network device on the first uplink control channel resource comprises:
performing at least one of the following operations, when the SR-prohibit timer is in a stopped state and the number of SR sending times is less than a preset maximum number of SR sending times:
sending the first SR to the access network device on an available first uplink control channel resource; or
increasing the number of SR sending times by 1, and starting the SR-prohibit timer.

10. The apparatus according to claim 8, wherein the first scheduling resource configuration further comprises the maximum number of SR sending times and the SR-prohibit timer.

11. The apparatus according to claim 8, wherein there is not a first scheduling resource configuration corresponding to the first logical channel, and the operations further comprises:
initiating random access to the access network device, and canceling the pending SR corresponding to the first logical channel; or
requesting an uplink resource from the access network device in a grant-free manner; or
sending the buffer status report (BSR) of the to-be-sent data and/or the to-be-sent data to the access network device in a grant-free manner.

12. The apparatus according to claim 8, wherein the first uplink resource comprises at least one of an uplink resource size, a modulation and coding scheme (MCS), uplink power, a resource usage numerology, and a resource usage numerology identifier.

13. A scheduling request processing method, comprising:
sending, by an access network device, first indication information to a terminal device, wherein the first indication information indicates a correspondence between a first logical channel of the terminal device and a first scheduling resource configuration, the first scheduling resource configuration comprises a first uplink control channel resource and a first scheduling resource configuration identifier;

receiving, by the access network device, a first scheduling request (SR) sent by the terminal device on the first uplink control channel resource, wherein the first SR is configured to request the access network device to allocate a first uplink resource;

determining, by the access network device, the first uplink resource, the first uplink resource is for receiving a buffer state report (BSR), the BSR corresponds to a to-be sent data, and the to-be sent data corresponds to the first logical channel; and sending, by the access network device, first uplink scheduling information to the terminal device, which indicates the first uplink resource.

14. The method according to claim 13, wherein the first uplink resource comprises at least one of an uplink resource size, a modulation and coding scheme MCS, uplink power, a resource usage numerology, and a resource usage numerology identifier.

15. The method according to claim 13, wherein the first scheduling resource configuration further comprises the maximum number of SR sending times and the SR-prohibit timer.

16. The method according to claim 13, wherein the method further comprises:

receiving, by the access network device, a random access request sent by the terminal device on a first physical random access channel (PRACH) resource, which corresponds to a second logical channel; and the random access request is configured to request the access network device to allocate a second uplink resource;

determining, by the access network device, the second uplink resource; wherein the second uplink resource is configured to carry second uplink data sent by the terminal device to the access network device, which corresponds to the second logical channel; and sending, by the access network device, second uplink scheduling information to the terminal device, which indicates the second uplink resource.

17. An apparatus, comprising a processor and a non-transitory computer readable storage medium storing a program, which when executed by the processor, causes the processor perform operations comprising:

sending first indication information to a terminal device, wherein the first indication information indicates a correspondence between a first logical channel of the terminal device and a first scheduling resource configuration, the first scheduling resource configuration comprises a first uplink control channel resource and a first scheduling resource configuration identifier;

receiving a first scheduling request (SR) sent by the terminal device on the first uplink control channel resource, wherein the first SR is configured to request the access network device to allocate a first uplink resource;

determining the first uplink resource, the first uplink resource is for receiving a buffer state report (BSR), the BSR corresponds to a to-be sent data, and the to-be sent data corresponds to the first logical channel; and sending first uplink scheduling information to the terminal device, which indicates the first uplink resource.

18. The apparatus according to claim 17, wherein the first uplink resource comprises at least one of an uplink resource size, a modulation and coding scheme (MCS), uplink power, a resource usage numerology, and a resource usage numerology identifier.

19. The apparatus according to claim 17, wherein the first scheduling resource configuration further comprises the maximum number of SR sending times and the SR-prohibit timer.

* * * * *

UNITED STATES PATENT AND TRADEMARK OFFICE
CERTIFICATE OF CORRECTION

PATENT NO. : 11,388,743 B2  
APPLICATION NO. : 16/787919  
DATED : July 12, 2022  
INVENTOR(S) : Yu et al.

Page 1 of 1

It is certified that error appears in the above-identified patent and that said Letters Patent is hereby corrected as shown below:

In the Claims

Claim 1: Column 26, Line 17: "sending, by the terminal device, a first scheduling request" should read -- sending, by the terminal device, a first scheduling request (SR) --.

Signed and Sealed this  
Twenty-second Day of November, 2022

Katherine Kelly Vidal  
*Director of the United States Patent and Trademark Office*